United States Patent Office 3,295,579
Patented Jan. 3, 1967

3,295,579
LOCK BOLT
Einar Medal, Washington, D.C., assignor to Allis-Chalmers Manufacturing Company, Milwaukee, Wis.
Filed Mar. 8, 1965, Ser. No. 437,743
2 Claims. (Cl. 151—33)

This invention relates generally to locking devices for screw threaded fasteners. More specifically, this invention relates to a simple and inexpensive method and apparatus for locking bolts, cap screws and other similar screw threaded fasteners.

Despite the countless number of nut and bolt locking devices presently at hand, there is still a great need for improved positive type locking devices for such screw threaded fasteners. This is because most of the positive type locking devices presently employed or known are either too complex and expensive for efficient commercial use, or lock so tightly that the nut or bolt is not easily removed once it is locked in place. On the other hand, the nonpositive type locking devices are usually cheaper and easier to use, but they are not often effective in locking fasteners subjected to the action of water flow, thermal transients, shock and the like.

Therefore, it is a primary object of this invention to provide a new and improved method and apparatus for positively locking screw threaded fasteners which is quite simple and inexpensive and yet may easily be disengaged so that the fastener may be removed.

It is another primary object of this invention to provide a method for locking conventional type bolts and cap screws having countersunk heads.

These and other objects and advantages are fulfilled by this invention as will become apparent from the following detailed description, especially when considered in conjunction with the accompanying drawing of which:

Figure 1:
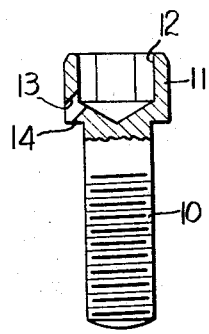
FIG. 1 is a cross sectional view of a hexagon countersunk bolt as used in a preferred embodiment of this invention.

Referring now to the drawings, the practice of this invention requires the use of a bolt having a cylindrical threaded shank 10 and a head 11 provided with a countersunk socket 12. The countersunk socket 12, as shown in the drawings, is preferably of hexagonal shape so that an interior or Allen wrench may be used to turn the bolt. However, any form of socket may be used for the purpose of this invention if other means are provided for turning the bolt. For example, one could use any standard hexagonal or square head bolt or cap screw by merely drilling the socket 12.

A small diameter hole or opening 13 extends through one annular sidewall of the bolt head 11, passing diagonally upward from the bolt head undersurface 14 into the socket 12. Preferably, opening 13 is positioned at such an angle that an imaginary extension thereof, through the socket 12, would extend clear of the opposite annular sidewall of the bolt head 11. Such positioning will allow the opening 13 to receive a drill bit and pin without interference by the opposing annular sidewall, as detailed below.

Figure 2:
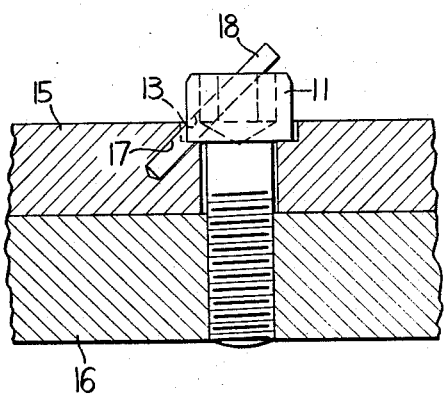
FIG. 2 is a cross sectional side view of the bolt shown in FIG. 1 in use and showing the locking pin in place prior to locking.
Figure 4:
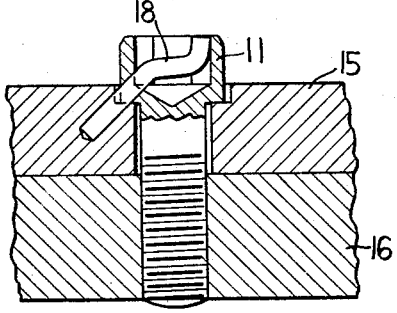
FIG. 4 is the same view as FIG. 2 after the pin has been bent to lock the bolt in place.
Figure 3:
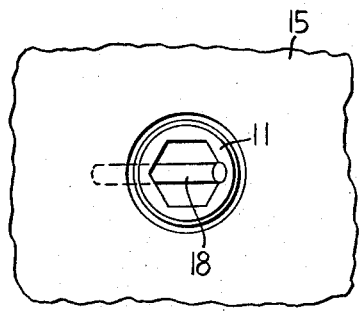
FIG. 3 is a top view of FIG. 2.

In operation, the lock bolt as described above is used to secure a structural plate member 15 to the base member 16. When the bolt has been tightened to the extent desired, a small hole 17 is drilled into plate 15 through opening 13, in such a manner that hole 17 constitutes an extension of opening 13 in the bolted structure. A pin 18 may then be inserted through the opening 13 and into hole 17 as shown in FIGS. 2 and 3. The pin 18 engages the walls of hole 17 and opening 13 and thus prevents the bolt from being loosened. Any suitable tool, such as a punch (not shown) may then be used to bend the protruding end of pin 18 downward into socket 12 so that said pin 18 is secured into position.

In the event it is desirable to remove or loosen the lock bolt, any suitable tool, such as a screw driver (not shown) may be used to bend pin 18 upward so that it may be easily extracted from hole 17 and opening 13.

An alternative to the above would be to use any standard countersunk bolt without opening 13. Then after the bolt is secured, opening 13 and hole 17 can be drilled at the same time. However, if case hardened heads are desired, the opening 13 would have to be drilled by the manufacturer before hardening.

The locking pin 18 is not a costly item as such pins could be made from any wire or rod as may be found in the miscellaneous stock of most production or repair shops.

It should be understood that the embodiment detailed above is presented only for purposes of illustration and should not limit the scope of this invention.

The embodiments of the invention in which an exclusive property or privilege is claimed are defined as follows:

1. A screw threaded fastener locking device comprising in combination, a bolt having a cylindrical threaded shank and a head, said head provided with a hexagonal countersunk socket defined by a circumferential outer wall and a small cylindrical opening extending diagonally upward from the undersurface of said head into the socket, said bolt securing a plate member to a base member in such a manner that the bolt head undersurface is in close engagement with the outer surface of the plate member, said plate member having a cylindrical hole in the upper surface thereof in contact with said bolt head undersurface and in alignment with the cylindrical opening in the bolt head, and a pin fitted through the said cylindrical opening in the bolt head and into said aligned hole in the plate member, said pin being received in said cylindrical hole to the fullest extent having the upper portion thereof extending axially above and radially beyond said socket prior to deformation said pin being adapted to have the upper portion thereof deformed by a double bend so as to be fully received into the socket in the bolt head and said pin engaging the wall portion of said socket so as to maintain assembly of the pin within said hole and said socket.

2. A screw threaded fastener locking device as defined in claim 1 wherein said small cylindrical opening extending diagonally upward from the undersurface of said head into the socket, communicates with the hexagonal socket at a point where two adjoining faces intersect, so that when said pin is received and deformed by the double bend it is fully received into the socket extending diametrically from opposing corners.

References Cited by the Examiner

UNITED STATES PATENTS

| | | | |
|---|---|---|---|
| 928,997 | 7/1909 | Muller | 151—68 |
| 1,084,850 | 1/1914 | Ford | 151—67 |
| 2,203,219 | 6/1940 | Jackman | 151—57 |
| 2,400,348 | 5/1946 | Greene | 151—67 |
| 2,794,474 | 6/1957 | Stukenborg | 151—54 |
| 2,795,261 | 6/1957 | Kustusch | 151—54 |

FOREIGN PATENTS

| | | |
|---|---|---|
| 217,253 | 9/1961 | Austria. |
| 346,893 | 4/1931 | Great Britain. |

CARL W. TOMLIN, *Primary Examiner.*

MARION PARSONS, JR., *Assistant Examiner.*